(12) United States Patent
Mascianica et al.

(10) Patent No.: US 9,761,918 B2
(45) Date of Patent: Sep. 12, 2017

(54) VEHICLE TRACTION BATTERY ASSEMBLY

(71) Applicant: Ford Global Technologies, LLC, Dearborn, MI (US)

(72) Inventors: Evan Mascianica, Detroit, MI (US); Josef Dollison, Petersburg, MI (US); Jeremy Samborsky, Livonia, MI (US); Daniel Miller, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 14/849,946

(22) Filed: Sep. 10, 2015

(65) Prior Publication Data

US 2017/0077566 A1  Mar. 16, 2017

(51) Int. Cl.
*H01M 10/65* (2014.01)
*H01M 10/625* (2014.01)
*H01M 2/20* (2006.01)
*H01M 2/10* (2006.01)
*H01M 2/12* (2006.01)
*H01M 10/6556* (2014.01)
*H01M 10/613* (2014.01)

(52) U.S. Cl.
CPC ....... *H01M 10/625* (2015.04); *H01M 2/1077* (2013.01); *H01M 2/1211* (2013.01); *H01M 2/1264* (2013.01); *H01M 2/206* (2013.01); *H01M 10/613* (2015.04); *H01M 10/6556* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 8,852,780 B2 | 10/2014 | Kleiman et al. | |
| 2013/0280574 A1* | 10/2013 | Kim | H01M 2/1077 429/120 |
| 2015/0295215 A1* | 10/2015 | Nagamine | H01M 2/1077 429/54 |

FOREIGN PATENT DOCUMENTS

DE    102009035465 A1    2/2011

* cited by examiner

*Primary Examiner* — Patrick Ryan
*Assistant Examiner* — Christopher Domone
(74) *Attorney, Agent, or Firm* — David B. Kelley; Brooks Kushman P.C.

(57) ABSTRACT

A traction battery assembly is provided. The traction battery assembly may include a battery cell array, a pair of endplates, and a first coolant channel. The battery cell array may define a longitudinal center axis along an upper face of the array. The pair of endplates may be configured to longitudinally retain the array therebetween. The first coolant channel may be in thermal communication with each battery cell along the upper face, span a longitudinal length of the array, and be offset from the longitudinal center axis. The assembly may include a second coolant channel in thermal communication with each battery cell, spanning the longitudinal length of the array, and covering a portion of the upper face of the array and a side face of the array. Each of the endplates may further define a plenum open to the first coolant channel and the second coolant channel.

19 Claims, 5 Drawing Sheets

VEHICLE TRACTION BATTERY ASSEMBLY

TECHNICAL FIELD

This disclosure relates to thermal management systems for traction batteries or high voltage batteries utilized in vehicles.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain a traction battery, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A traction battery assembly includes a battery cell array, a pair of endplates, and a first coolant channel. The battery cell array defines a longitudinal center axis along an upper face of the array. The pair of endplates is configured to longitudinally retain the array therebetween. The first coolant channel is in thermal communication with each battery cell along the upper face, spans a longitudinal length of the array, and is offset from the longitudinal center axis. The assembly may include a second coolant channel in thermal communication with each battery cell, spanning the longitudinal length of the array, and covering a portion of the upper face of the array and a side face of the array. Each of the endplates may further define a plenum open to the first coolant channel and the second coolant channel. The assembly may include a pair of side rails laterally retaining the array therebetween. Each of the side rails may span the longitudinal length of the array, be secured at each end to each of the endplates, and be configured to compress the second coolant channel against the array. The assembly may include a third coolant channel connected to the first coolant channel via a bridge. Each battery cell may include a vent port oriented in parallel with the longitudinal center axis. The first coolant channel, the second coolant channel, the bridge, and an upper face of each battery cell may define a vent chamber to receive gases from the vent ports. Each of the endplates may define a plenum open to the first coolant channel. The assembly may include a busbar assembly spanning the longitudinal length of the array and secured to an upper portion of the first coolant channel.

A traction battery assembly includes a battery cell array, a pair of endplates, and a first coolant channel. The battery cell array defines an upper face and a side face. Each of the pair of endplates is disposed on opposite ends of the array and each defines a plenum having a port. The first coolant channel spans a longitudinal length of the array, is secured to both endplates, is in thermal communication with each battery cell of the array, covers a portion of the upper and side faces, and defines an opening in registration with the ports. The assembly may include a second coolant channel in thermal communication with each battery cell along the upper face. The second coolant channel may span the longitudinal length of the array and may be offset from a longitudinal central axis of the array on the upper face. Each battery cell may include a terminal extending therefrom and disposed between the first and second coolant channels. The assembly may include a third coolant channel connected to the second coolant channel via a bridge. The second coolant channel, the third coolant channel, the bridge, and upper portions of the battery cells may define a vent chamber to receive gases. One of the endplates may define a gas outlet open to the vent chamber. The assembly may include a busbar assembly including a plurality of busbars electrically connecting terminals of adjacent battery cells. The busbar assembly may define a flange surrounding the terminals and arranged with the battery cells, endplates, and channels to electrically isolate the busbars therefrom. Each of the endplates may define a plenum open to the first coolant channel.

A traction battery assembly includes an array of battery cells, a center bar, a pair of corner coolant channels, and a pair of endplates. The array of battery cells defines a longitudinal central axis along an upper face and each of the cells includes first and second terminals. The center bar defines first and second coolant channels and a bridge spanning therebetween and above the longitudinal axis. The pair of corner coolant channels extends along upper corner regions defined by the battery cells. Each of the pair of endplates is disposed at opposite ends of the array and defines a plenum in fluid communication with the channels. The cells and channels are arranged with one another such that one of each of the terminals of each battery cell is located between one of the first and second coolant channels and one of the corner coolant channels. The assembly may include a busbar assembly having a housing and a plurality of busbars electrically connecting adjacent terminals. The busbars may be arranged with the cells, channels, and endplates to electrically isolate the busbars therefrom. The center bar and upper face may define a chamber therebetween and extending along the longitudinal axis. Each of the endplates may further define an inlet or outlet open to the respective plenum. The center bar and upper faces of the cells may define a sealed vent chamber to receive gases from the cells. One of the endplates may further define a through-hole sealed from the plenum and open to the vent chamber.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
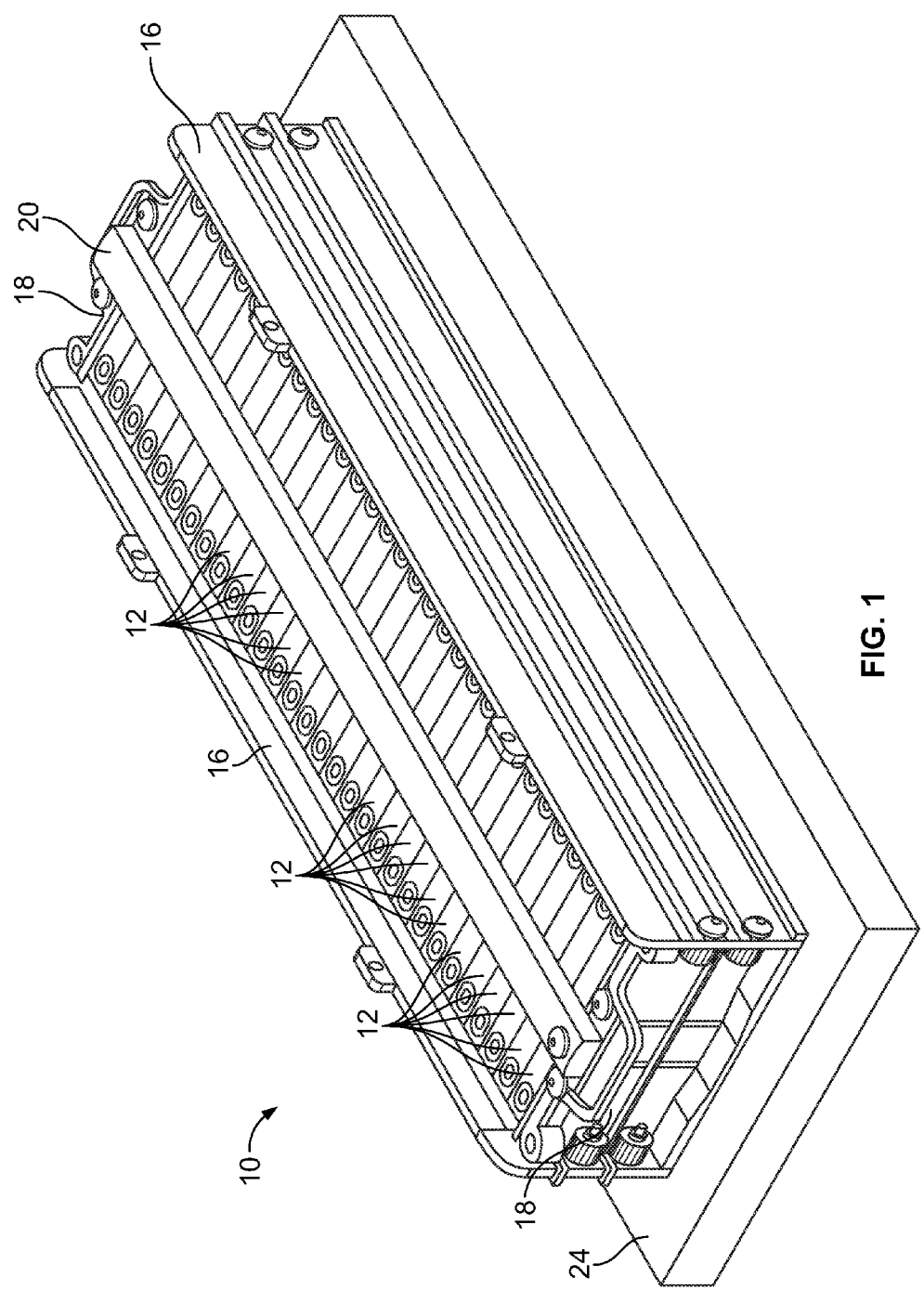
FIG. 1 is a perspective view of an example of a portion of a vehicle traction battery supported by a tray.

FIG. 1 shows an example of a portion of a traction battery assembly, referred to generally as a traction battery assembly 10 herein. The traction battery assembly 10 may be heated and/or cooled using a liquid thermal management system, an air thermal management system, or other method as known in the art. The traction battery assembly 10 may include an array of battery cells 12, a pair of rails 16, a pair of endplates 18, and a center bar 20. The battery cells 12 may be retained by the pair of rails 16, the pair of endplates 18, and the center bar 20. A tray 24 may support the traction battery assembly 10. A thermal plate (not shown) may be located below the traction battery assembly 10 to assist in managing thermal conditions thereof.

The thermal plate and the battery cells 12 may transfer heat between one another during vehicle operations. Uniform thermal fluid distribution and high heat transfer capability are two considerations for providing effective thermal management of the battery cells 12 and other surrounding components. Charging and discharging the battery cells 12 may generate heat which may negatively impact performance and life of the battery cells 12 if not removed. Alternatively, the thermal plate may also provide heat to the battery cells 12 when subjected to cold temperatures.

Different traction battery assembly configurations may be available to address individual vehicle variables including packaging constraints and power requirements. The traction battery assembly 10 may be contained within a cover or housing (not shown) to protect and enclose the battery cells 12 and other surrounding components. The traction battery assembly 10 may be positioned at several different locations including below a front seat, below a rear seat, or behind the rear seat of the vehicle, for example. However, it is contemplated that the traction battery assembly 10 may be positioned at any suitable location in the vehicle.

The battery cells 12, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells 12 may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

Temperature conditions of battery cells affect performance of traction batteries. Achieving battery cell temperatures within a range relative to one another and below a predefined maximum temperature may positively affect power output of the traction battery. For example, upper portions of the battery cells 12 of the traction battery assembly 10 may have a higher temperature than lower portions of the battery cells 12 during operation due to heat generation near terminals.

Figure 2:
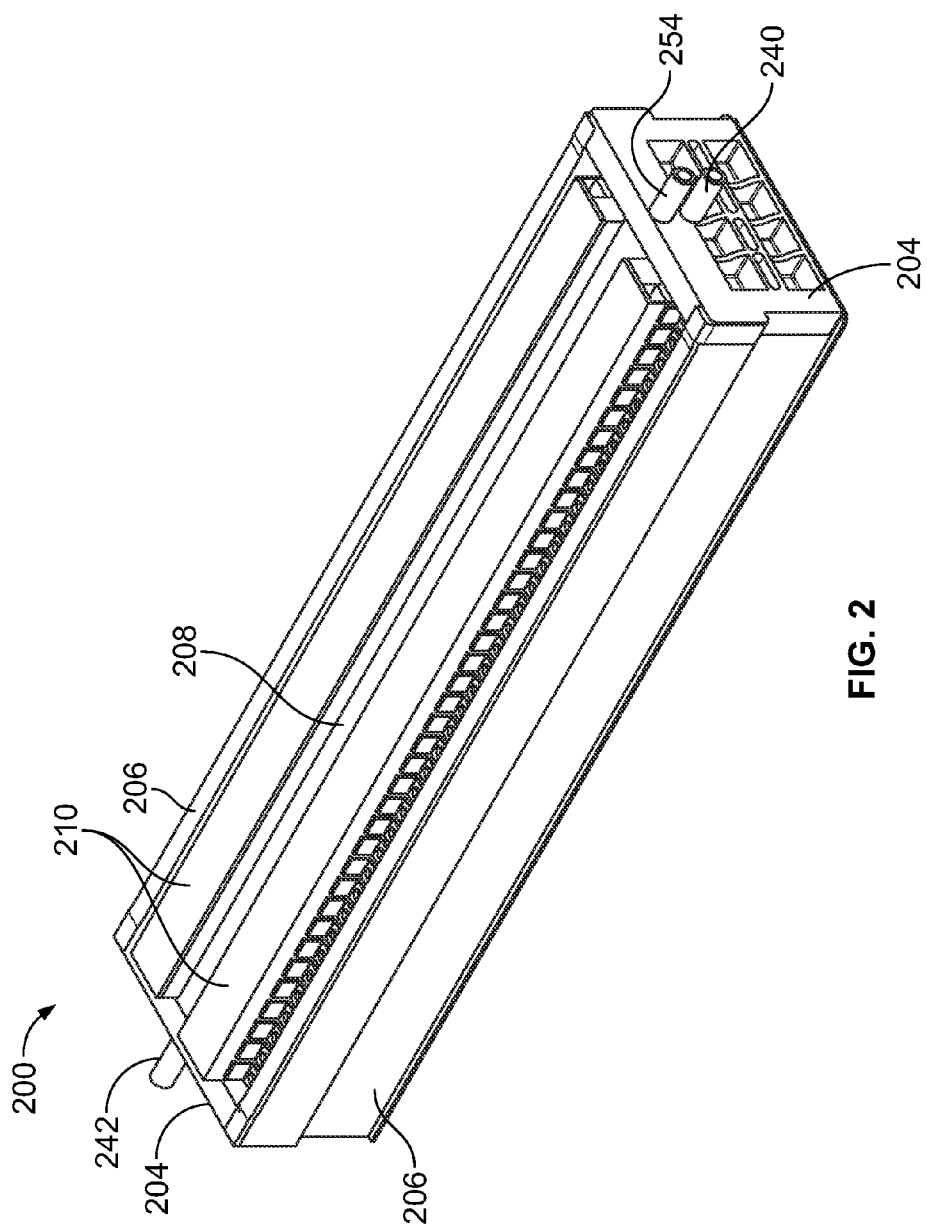
FIG. 2 is a perspective view of an example of a vehicle traction battery assembly.

FIG. 2 shows an example of a portion of a traction battery assembly, referred to generally as a traction battery assembly 200 herein. The traction battery assembly 200 may include an array of battery cells 202 (not visible in FIG. 2), a pair of endplates 204, a pair of side rails 206, a center bar assembly 208, and a pair of busbar assemblies 210. The endplates 204 may longitudinally retain the array of battery cells 202 therebetween. The side rails 206 may laterally retain the array of battery cells 202 therebetween. The endplates 204 and the side rails 206 may be secured to one another. The center bar assembly 208 may span a longitudinal length of the array of battery cells 202 and be secured to each of the endplates 204 to assist in retaining the array of battery cells 202. The traction battery assembly 200 may be mounted to a support structure (not shown) and mounted within a vehicle.

Figure 3:
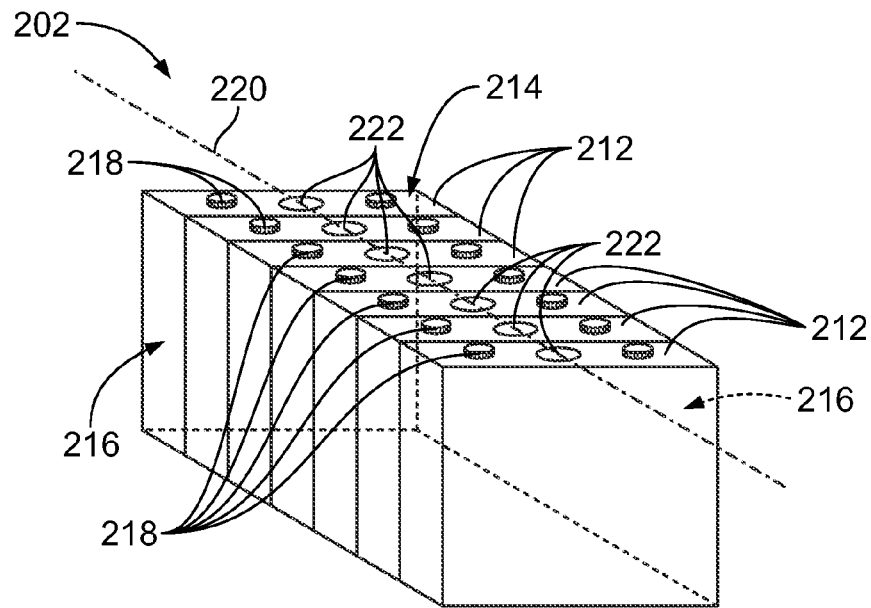
FIG. 3 is a perspective view of an example of an array of battery cells of the vehicle fraction battery assembly of FIG. 2.

FIG. 3 shows the array of battery cells 202 without some of the surrounding components. The array of battery cells 202 may include a plurality of battery cells 212 stacked together. The array of battery cells 202 may define an upper face 214 and a pair of side faces 216. The array of battery cells 202 may be made up of prismatic cells which include electrochemical cells to convert stored chemical energy to electrical energy. The array of battery cells 202 may define a longitudinal axis 220 along a central portion of the upper face 214. Each battery cell 212 may include two terminals 218 extending therefrom. Each battery cell 212 may include a vent port 222 to assist in releasing gases during, for example, a failure event. The vent ports 222 may be aligned with the longitudinal axis 220.

Figure 4:
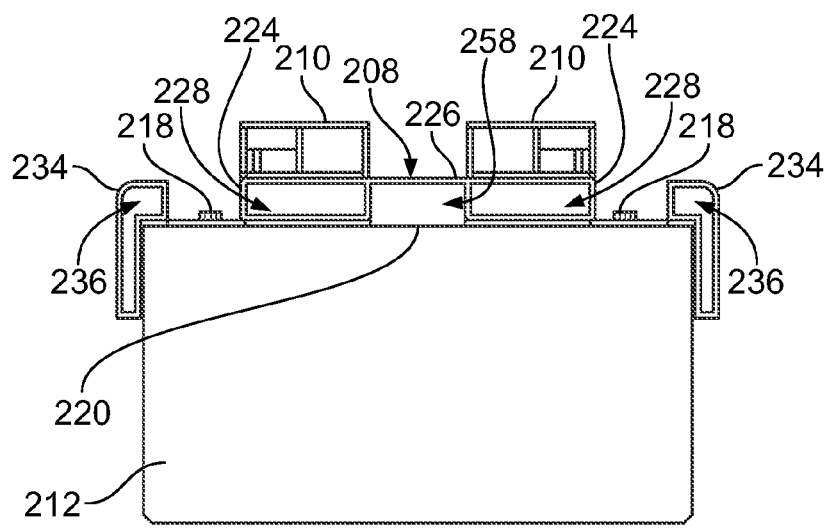
FIG. 4 is a front view, in cross-section, of a portion of the vehicle traction battery assembly of FIG. 2.

FIG. 4 shows a cross-sectional view of a portion of the traction battery assembly 200. The center bar assembly 208 may define a first pair of coolant channels 224 and a bridge 226 spanning therebetween. Each of the first pair of coolant channels 224 may define a region 228 for coolant to flow therethrough. The first pair of coolant channels 224 may be arranged with the array of battery cells 202 such that coolant flowing through the first pair of coolant channels 224 is in thermal communication with the array of battery cells 202 to assist in managing thermal conditions thereof. Each of the first pair of coolant channels 224 may be offset from the longitudinal axis 220.

Each of a second pair of coolant channels 234 may span the longitudinal length of the array of battery cells 202. Each of the second pair of coolant channels 234 may define a region 236 for coolant to flow therethrough. Each of the second pair of coolant channels 234 may cover a portion of the upper face 214 and the side face 216 of the array of battery cells 202 such that the second pair of coolant channels 234 are in thermal communication therewith. Locating the first pair of coolant channels 224 and the second pair of coolant channels 234 adjacent upper portions of the battery cells 212 may assist in mitigating an excess amount of heat generated near the terminals 218. For example, each of the second pair of coolant channels 234 may extend along upper corner portions of the battery cells 212. The side rails 206 may assist in compressing the second pair of coolant channels 234 against the array of battery cells 202. The terminals 218 may be disposed between respective coolant channels 224 and coolant channels 234. Optionally, a thermal interface layer may be mounted between the channels and the array of battery cells 202 to create a dielectric boundary between the two.

Figure 5B:
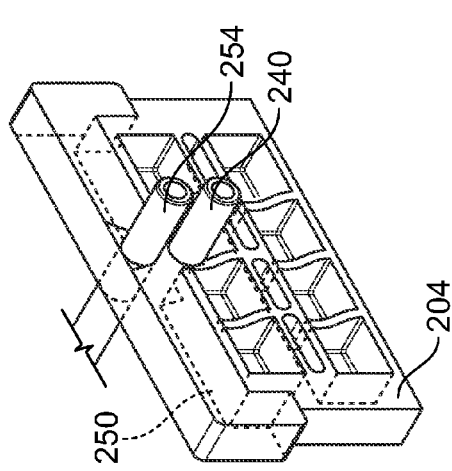
FIG. 5B is a perspective view of an example of an endplate of the vehicle traction battery assembly of FIG. 2 showing an example of an internal plenum.
Figure 5C:
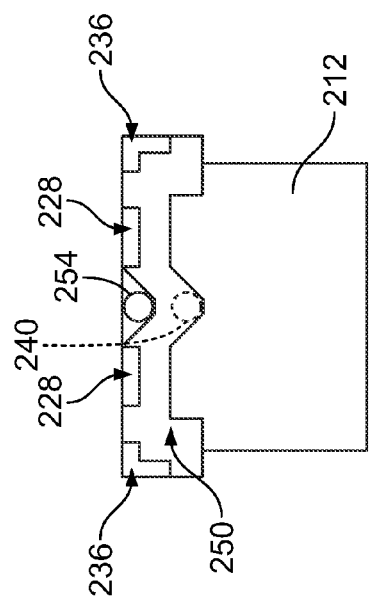
FIG. 5C is a front view, in cross-section, of the endplate of FIG. 5B.
Figure 5A:
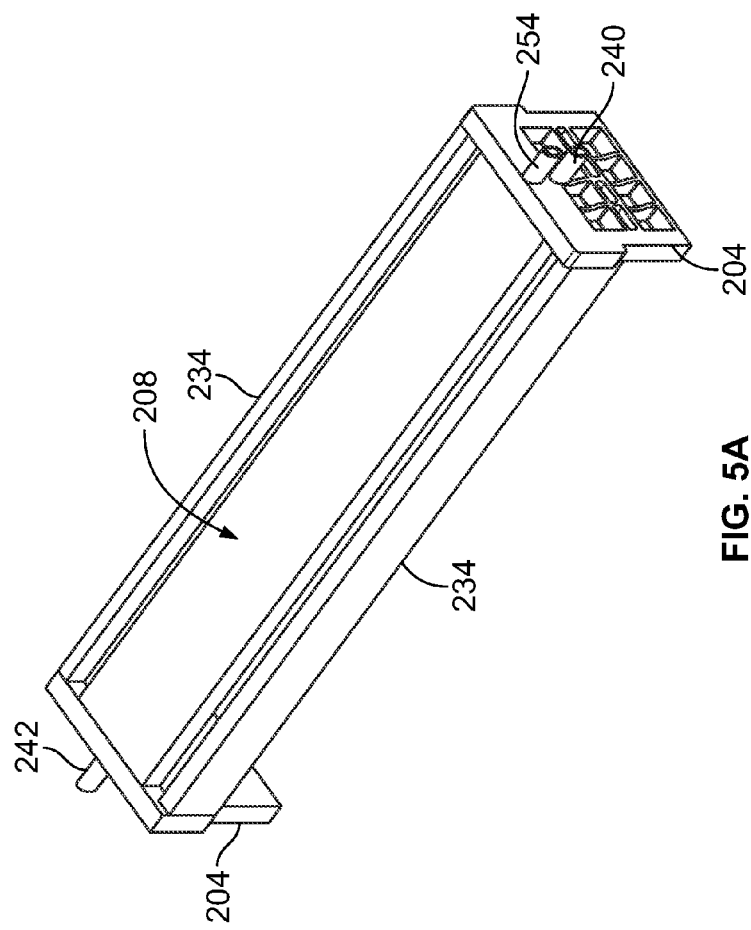
FIG. 5A is a perspective view of a portion of the vehicle traction battery assembly of FIG. 2.

FIG. 5A shows the center bar assembly 208 and the second pair of coolant channels 234 disposed between the endplates 204. One of the endplates 204 may include an inlet 240 and the other of the endplates 204 may include an outlet 242. Each of the endplates 204 may define a plenum therein. For example, a plenum 250 may be defined by the endplate 204 as shown in FIG. 5B. Each of the plenums 250 may be open to the channels and to the respective inlet 240 or outlet 242 such that the inlet 240 and the outlet 242 are in fluid communication with one another. FIG. 5C shows a cross-sectional view of one of the endplates 204. The inlet 240 may open to the plenum 250 such that coolant may flow therein. The coolant may then flow from the plenum 250 into the channels and their respective regions 228 and 236 such that the coolant may flow along the battery cells 212 to assist in thermal management thereof. One of the endplates 204 may include a gas outlet 254 to receive gases from a vent chamber. The gas outlet 254 is sealed from the plenum 250.

Figure 6:
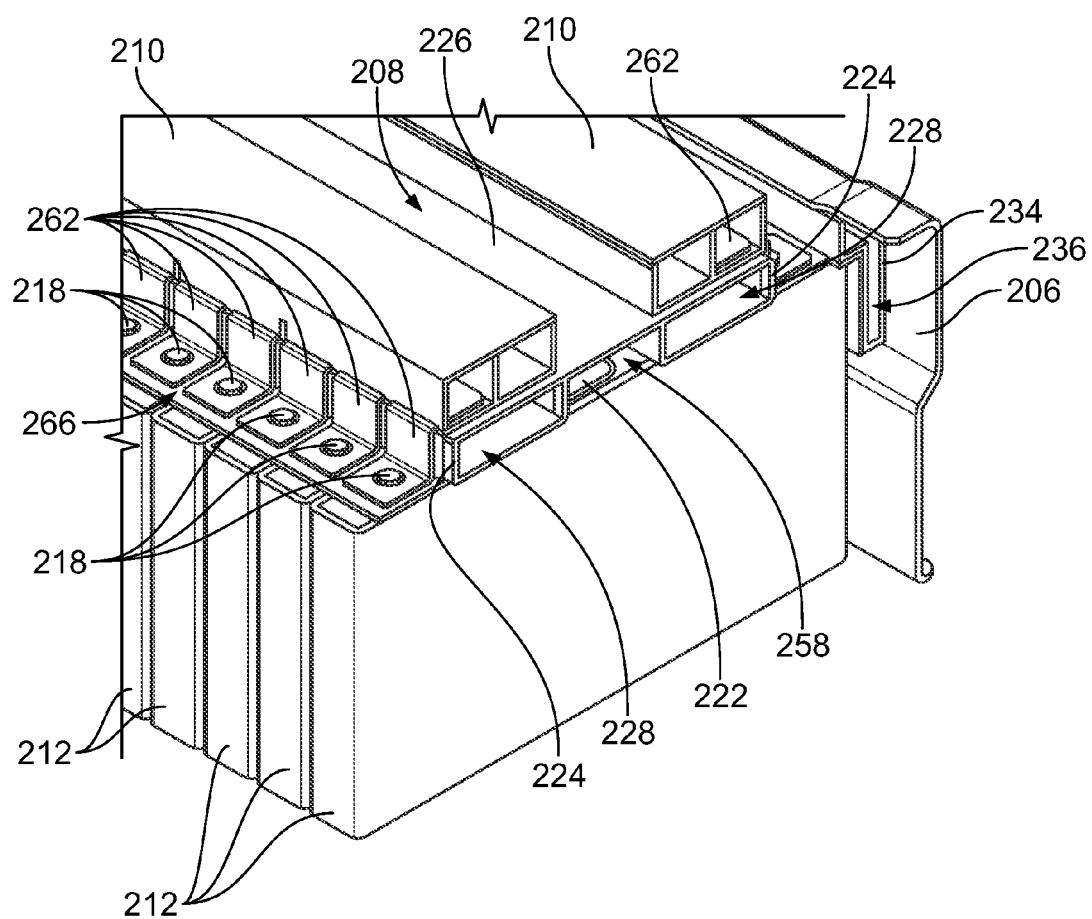
FIG. 6 is a perspective view of a portion of the vehicle traction battery assembly of FIG. 2.

For example and now additionally referring to FIG. 6, the center bar assembly 208 and upper portions of the battery cells 212 may define a vent chamber 258 therebetween. The vent chamber 258 may be sealed to capture any gases exiting from the battery cells 212 via the respective vent port 222. One of the endplates may define a through-hole open to the vent chamber 258 such that gas may exit the vent chamber 258 and gas outlet 254 without entering the plenum 250. The vent chamber 258 may extend along the longitudinal length of the array of battery cells 212. Each of the pair of busbar assemblies 210 may include a plurality of busbars 262. The busbars 262 may electrically connect terminals 218 from adjacent battery cells 212. Each of the pair of busbar assemblies 210 may include a flange 266 to assist in electrically isolating the terminals 218 and busbars 262 the endplates 204 and the channels.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
   a battery cell array defining a longitudinal center axis along an upper face of the array;
   a pair of endplates to longitudinally retain the array therebetween and each endplate defining a plenum; and
   a first coolant channel open to the plenums and in thermal communication with each battery cell along the upper face, spanning a longitudinal length of the array, and offset from the longitudinal center axis.

2. The assembly of claim 1, further comprising a second coolant channel in thermal communication with each battery cell, spanning the longitudinal length of the array, and covering a portion of the upper face of the array and a side face of the array.

3. The assembly of claim 2, wherein each of the endplates further defines a plenum open to the first coolant channel and the second coolant channel.

4. The assembly of claim 2, further comprising a pair of side rails laterally retaining the array therebetween, each spanning the longitudinal length of the array, secured at each end to each of the endplates, and configured to compress the second coolant channel against the array.

5. The assembly of claim 2, further comprising a third coolant channel connected to the first coolant channel via a bridge, wherein each battery cell comprises a vent port oriented in parallel with the longitudinal center axis, and wherein the first coolant channel, the second coolant channel, the bridge, and an upper face of each battery cell defines a vent chamber to receive gases from the vent ports.

6. The assembly of claim 1, further comprising a busbar assembly spanning the longitudinal length of the array and secured to an upper portion of the first coolant channel.

7. A traction battery assembly comprising:
   a battery cell array defining an upper face and a side face;
   a pair of endplates disposed on opposite ends of the array and each defining a plenum having a port; and
   a first coolant channel spanning a longitudinal length of the array, secured to both endplates, in thermal communication with each battery cell of the array, covering a portion of the upper and side faces, and defining an opening in registration with the ports.

8. The assembly of claim 7, further comprising a second coolant channel in thermal communication with each battery cell along the upper face, spanning the longitudinal length of the array, and offset from a longitudinal central axis of the array on the upper face.

9. The assembly of claim 8, wherein each battery cell includes a terminal extending therefrom and disposed between the first and second coolant channels.

10. The assembly of claim 8, further comprising a third coolant channel connected to the second coolant channel via a bridge, wherein the second coolant channel, the third coolant channel, the bridge, and upper portions of the battery cells define a vent chamber to receive gases.

11. The assembly of claim 10, wherein one of the endplates defines a gas outlet open to the vent chamber.

12. The assembly of claim 11, further comprising a busbar assembly including a plurality of busbars electrically connecting terminals of adjacent battery cells and defining a flange surrounding the terminals and arranged with the battery cells, endplates, and channels to electrically isolate the busbars therefrom.

13. The assembly of claim 7, wherein each of the endplates defines a plenum open to the first coolant channel.

14. A traction battery assembly comprising:
- an array of battery cells defining a longitudinal central axis along an upper face and each of the cells including first and second terminals;
- a center bar defining first and second coolant channels and a bridge spanning therebetween and above the longitudinal central axis;
- a pair of corner coolant channels extending along upper corner regions defined by the battery cells; and
- a pair of endplates each disposed at opposite ends of the array and defining a plenum in fluid communication with the channels,
- wherein the cells and channels are arranged with one another such that one of each of the terminals of each battery cell is located between one of the first and second coolant channels and one of the pair of corner coolant channels.

15. The assembly of claim 14, further comprising a busbar assembly having a plurality of busbars electrically connecting adjacent terminals and a housing, wherein the busbars are arranged with the cells, channels, and endplates to electrically isolate the busbars therefrom.

16. The assembly of claim 14, wherein the center bar and upper face define a chamber therebetween and extending along the longitudinal central axis.

17. The assembly of claim 14, wherein each of the endplates further defines an inlet or outlet open to a respective plenum.

18. The assembly of claim 14, wherein the center bar and upper faces of the cells define a sealed vent chamber to receive gases from the cells.

19. The assembly of claim 18, wherein one of the endplates further defines a through-hole sealed from the plenum and open to the vent chamber.

* * * * *